Patented Apr. 19, 1932

1,854,557

UNITED STATES PATENT OFFICE

TREADWAY B. MUNROE AND ELBERT C. LATHROP, OF CHICAGO, ILLINOIS, ASSIGNORS TO THE CELOTEX COMPANY, OF CHICAGO, ILLINOIS, A CORPORATION OF DELAWARE

PREPARATION AND PRESERVATION OF FIBER

No Drawing. Application filed November 29, 1929. Serial No. 410,630.

This invention relates to a method of preserving and storing raw material, more particularly bagasse, and has for its object to provide a process which will be certain in action and more economical in use than those heretofore proposed.

With these and other objects in view, the invention consists in the novel steps and combinations of steps constituting the process, all as will be more fully hereinafter disclosed and particularly pointed out in the claims.

A process is in use in the art whereby bagasse is baled and piled in such a manner as to take advantage of the fermentation action which is accompanied by heat so that said heating up of the bales and the mass of bales brings about a temperature and a duration of this temperature over a long period of time so that a condition of pasteurization of the internal portion of the masses thus obtained sterilizes the masses, and stops fermentation and consequent deterioration of fiber.

In order that the precise invention may be more clearly understood it is said: The bagasse of sugar cane as it leaves the sugar mill, contains varying, but small amounts of unextracted sugar together with carbohydrate gums not easily soluble in water. The water content of such a mass of raw bagasse is substantially 50%, depending upon the particular actions to which it was subjected prior to leaving the sugar mill. Other mature stalk materials such as sorghum, corn stalks, broom straw and other fibrous members of the grass family contain varying amounts of moisture dependent upon conditions prior to baling, but in general it might be stated that with the usual type of balers now used, the moisture content of such fibrous mass would rarely exceed 70%. If the bagasse were immediately dried after leaving the mill, very little, if any, change in the mass would be subsequently brought about by fermentation action since it is well known that microorganisms require water in order to grow and carry on their processes of metabolism, known as fermentations. But such drying of bagasse or other stalks is found too costly to be practicable. When masses of bagasse containing moisture, on the other hand, leave the mill and are piled or are baled, alcoholic, acetic acid, lactic acid fermentations begin within a day or a few days thereafter. These said alcoholic and acetic and lactic acid fermentations are confined, however, to a destruction of the sugar content and of the gums present and generally found, themselves largely confined, in the natural pith, so that subsequently no fiber or other real values of the bagasse material are lost by the same.

These fermentations are also accompanied by the production of heat and by the production of compounds which make more favorable the conditions of growth of other organisms. Of these other organisms there has been found present in the bagasse bacteria, tricharedma, monilia, fusarium, aspergillus, penicilium, mucor, wood-destroying organisms, and mushrooms, such as psilocybe, agaricus, etc. Many of these last named organisms ferment the bagasse in a destructive manner causing a weakening of the fibers or a loss of the fibers or of other valuable constituents of the bagasse. It has, therefore, been important to find a way of preventing the continued presence of these last mentioned fermentation organisms and to preserve the bagasse from the resulting damage to the end that substantially no values are lost before the fibers are cooked preparatory to making them into the desired heat insulation board. Therefore, if the pith were separated and removed from the fibrous portion of the mass, then the fermentations would be materially reduced if not altogether prevented.

According to this invention the bagasse primary or fibrous mass in somewhat of its natural condition and containing an appreciable amount of pith can be advantageously preserved and stored if the pith be first removed. This is best accomplished by subjecting the primary material to any well known shredding action which, while physically dividing the mass into two fractions, one comprising the fibrous material and the other comprising the pith particles, does not break down the natural characteristics of the individual fractions. In other words, the primary material, containing approximately 60% of its weight of water, is so shredded and screened as to obtain in one fraction of fibrous material containing from 30% to 40% of moisture, and a second fraction of pith particles which will have in the neighborhood of 80% moisture content, and the substance of each fraction will be substantially undamaged. Each fraction is then separately handled.

The fibrous portion is piled, or is baled and the bales piled, with proper engagement for ventilation, etc. particularly if the material is made into piles of considerable size. In actual commercial practice, the piles of bales assume enormous proportions, it not being uncommon to have 500 tons of fibrous material in one pile of 4,000 bales. These ultimate piles of superimposed layers are made as high as forty feet and provided with a roof or cover to particularly protect the top of the pile from rain or other precipitation which would add water or moisture to the mass. In this respect the piles may be formed with straight sides or with stepped or pyramidal sides but in either case the cover should be sufficient to prevent additional moisture entering and passing downwardly through the pile, which latter condition would bring about conditions more favorable for the growth of cellulose destroying organisms.

After the pile is made an alcoholic fermentation will set in, transforming the remaining residual sugar of the primary material, and possibly a slight amount of some of the other substances, through an exothermic action to alcohol, which in turn will be oxidized to acetic acid. This fermentation will, however, be slight as compared to that which would be created in a pile of material not so treated as hereinbefore explained. Due to the heating resulting from said fermentation and to the absorption of moisture from the fiber by the carbon-dioxide produced in the fermentations, the moisture content of the pile will be reduced to somewhere in the neighborhood of 25%, and the heat will more or less pasteurize the mass. In fact the piled fibrous mass with its moisture content reduced to said 25% will be subject to little, or no further, deterioration since said moisture is insufficient for the life processes of the bacteria, fungi, etc. which would attack the fiber were its moisture content appreciably higher.

The pith fraction which was previously divided from the primary material can be either immediately dried to a moisture content of some 10% to 25% in an ordinary drum drier or other type of drier, or, should it be desired, it can be handled in substantially the same manner as the fibrous fraction was handled. Due to the size and condition of the pith fraction it would, necessarily, have to be confined as in sacks or baled with some sort of confining cover but, except for this, the storage and preservation would be the same as hereinbefore stated.

Thus it will be seen that by this invention there is presented a surprisingly simple process of preventing the natural deterioration for pulp making purposes of a mass of bagasse or other stalk-like material containing sugar and gummy substances, as well as considerable moisture and other food for micro-organisms, whereby the natural characteristics of the fibers are maintained, which consists in dividing the primary material into a fibrous fraction and a pithy fraction, forming one of said fractions into bales and then creating a pile of these bales with a roof covering over said pile whereby fermentation within the mass capable of destroying the fibers will be substantially prevented. In other words, this process is well adapted for application to industries in which the individual fiber of the primary material in its natural characteristics is desired, such for example as in the manufacture of wall boards having heat and sound insulation values due to the interstices formed by the crossed or entangled fibers of paper and the like. In such industries the primary material is subjected to shredding and subsequent cooking actions but, before either of these, the material heretofore was baled and piled with added chemicals to counteract or reduce the loss or deterioration of fiber by fermentation. The different chemicals used varied in cost but even with the cheapest there was the additional expense of applying it to the material.

By this invention the primary material is subjected to the shredding action before instead of after storage, as a result of which the fibrous fraction of said material can be baled and stored without the addition of any preservative, chemical or otherwise, thereby reducing the cost of manufacture of the product.

It is obvious that those skilled in the art may vary the process as above outlined without departing from the spirit of the invention above stated and, therefore it is not desired to be limited to the foregoing disclosure except as may be required by the claims.

What is claimed is:—

1. The process of preventing the natural deterioration of a mass of fibrous material having a moisture content of approximately 60% which consists in separating the pith particles from said material; forming said mass into bales; and stacking said bales under cover.

2. The process of preventing the natural deterioration of a mass of fibrous material having a moisture content of approximately 60% which consists in separating the pith particles from said material; reducing the moisture content of the fibrous fraction;

forming said fraction into bales; and stacking said bales under cover.

3. The process of preventing the natural deterioration of a mass of fibrous material having a moisture content of approximately 60% which consists in separating the pith particle from said material; reducing the moisture content of the fibrous fraction; forming said fraction into bales; and storing said bales free from additional moisture sufficient to cause continued growth of aerobic micro-organisms.

4. The process of preventing the natural deterioration of a mass of fibrous material having a moisture content of approximately 60% which consists in separating the pith particles from said material; reducing the moisture content of the fibrous fraction to 35%; forming said fraction into bales; and stacking said bales under cover.

5. The process of preserving bagasse fiber which consists in dividing the primary bagasse material into two fractions, one comprising the fibrous material and the other comprising pith particles; forming said fractions separately into storage units; and storing said units free from additional moisture.

6. The process of preserving bagasse fiber which consists in shredding the primary bagasse material to divide the same into two fractions, one comprising the fibrous material and the other comprising pith particles; reducing the moisture content of each fraction; forming said fractions separately into storage units; and storing said units free from additional moisture.

7. The process of preserving bagasse fiber which consists in dividing the primary bagasse material into two fractions, one comprising the fibrous material and the other comprising pith particles; reducing the moisture content of the fibrous fraction to approximately 35%; forming said fractions separately into storage units; and storing said units free from additional moisture.

8. The process of preserving bagasse fiber which consists in dividing the primary bagasse material into two fractions, one comprising the fibrous material and the other comprising pith particles; reducing the moisture content of the fibrous fraction to approximately 35% and of the pith fraction to approximately 15%; forming said fractions separately into storage units; and storing said units free from additional moisture.

9. The method of storing a fibrous plant material having a relatively high average moisture content, wherein the material is separated into its fibrous and pith portions, of which portions the fiber contains the minor and the pith the major portion of the moisture, the fiber portion subsequently stored whereby through normal evaporation and by the heat generated during the ensuing fermentations its moisture content is lowered below about 25% or that necessary for the life processes of destructive bacteria, fungi, and the like.

10. The method of storing a fibrous plant material having a relatively high average moisture content, wherein the material is separated into its fibrous and pith portions, of which portions the fiber contains the minor and the pith the major portion of the moisture, the fiber portion subsequently stored whereby through normal evaporation and by the heat generated during the ensuing fermentations its moisture content is lowered below about 25% or that necessary for the life processes of destructive bacteria, fungi, and the like, the thus dried material thereafter protected from additional moisture precipitation.

In testimony whereof we affix our signatures.

TREADWAY B. MUNROE.
ELBERT C. LATHROP.